United States Patent [19]
Suzuki

[11] 3,829,638
[45] Aug. 13, 1974

[54] DIRECTION INDICATOR AUTOMATIC RETURN DEVICE FOR TURN INDICATOR SWITCHES

[75] Inventor: Masaru Suzuki, Chiryu, Japan

[73] Assignee: Kabushiki Kaisha Tokai Rika Denki Seisakusho, Nishikasugai-gun, Aichi-ken, Japan

[22] Filed: Dec. 20, 1972

[21] Appl. No.: 316,820

[52] U.S. Cl............ 200/61.27, 200/61.3, 200/61.34
[51] Int. Cl. ............................................. H01h 3/16
[58] Field of Search ......................................
200/61.27–61.38, 61.54–61.57; 74/567

[56] References Cited
UNITED STATES PATENTS

| | | | |
|---|---|---|---|
| 2,800,541 | 7/1957 | Brown et al. | 200/61.34 |
| 2,902,556 | 9/1959 | Dryer | 200/61.34 |
| 2,999,911 | 9/1961 | Dryer et al. | 200/61.34 |
| 3,065,650 | 11/1962 | Brown | 74/567 |
| 3,201,536 | 8/1965 | Fisher et al. | 200/61.3 X |
| 3,209,092 | 9/1965 | Vitaloni et al. | 200/61.54 X |
| 3,604,867 | 9/1971 | Suzuki | 200/61.34 |
| 3,609,264 | 9/1971 | Suzuki et al. | 200/61.34 |
| 3,699,286 | 10/1972 | Suzuki et al. | 200/61.34 |

Primary Examiner—James R. Scott
Attorney, Agent, or Firm—Craig & Antonelli

[57] ABSTRACT

A direction indicator automatic return device in a motor-vehicle direction indicator, wherein a rotary bracket, or element, turns with a steering column is made of synthetic resin, forms a curved portion which passes round the steering column, and has a pair of flexible arms, each of which is supported at one end, and separated by a gap from the curved portion, and each extension arm may be brought into a position where it can be engaged by a restoring cam or rigid engagement projections upon left or right turn indication operation.

3 Claims, 4 Drawing Figures

DIRECTION INDICATOR AUTOMATIC RETURN DEVICE FOR TURN INDICATOR SWITCHES

The present invention relates to an automatic restoring or return device for motor-vehicle direction indicators.

In a motor-vehicle direction indicator with a main body supporting a movable bracket which can be turned to a left turn indication position, a right turn indicator position, and a neutral position, provided with a restoring cam, an element which is secured to the steering column to rotate together with the steering column, includes a pair of flexible arms which may be engaged with the restoring cam after it is turned to the left or right turn indication positions.

The object of the present invention is to provide an improved automatic restoring device for motor-vehicle direction indicators which enables return of the steering column without the complex structure of conventional devices.

To achieve the above object, in the automatic restoring device for direction indicators according to the present invention, a pair of cantilever-like arms are provided of a synthetic resin on a rotary body mounted on a steering column with a movable bracket able to turn from a central, neutral position to left or right turn indication positions, where it is temporarily held by an angle control device; the arms bend smoothly out of the way of engagement projections rigidly formed on the movable bracket when a steering column is turned for a change of direction, but when the steering column is turned back, ensures the automatic return of the movable bracket to the neutral position.

The features of the invention consist essentially of providing at the outer periphery of a rotary body, that turns together with the steering column, flexible or elastic projections, and of forming engagement projections rigidly integral with the movable bracket, the engagement projections being brought within the rotating circle of the flexible projections upon the turning of the movable bracket in the left or right indication direction, but not when the movable bracket is in the neutral position. According to the present invention, the function of conventional ratchets is effected by providing in the movable bracket simply formed, integral rigid projections, and by the flexible projections, instead of conventional cam structures, provided at the periphery of the rotary body that turns together with the steering column, the flexible projections, when the steering column is turned to change direction after the movable bracket is turned left or right, are pressed inwards by the rigid projections and offer no hindrance to movement of the steering column, and, when the steering column is turned back, engage the rigid projections and ensure the automatic return of the movable bracket to a neutral position. The invention thus offers a simple construction and great advantages in industrial production.

This and other objects and features of the present invention will become apparent from the description of preferred embodiment thereof, with reference to the attached drawings, in which.

Figure 1:
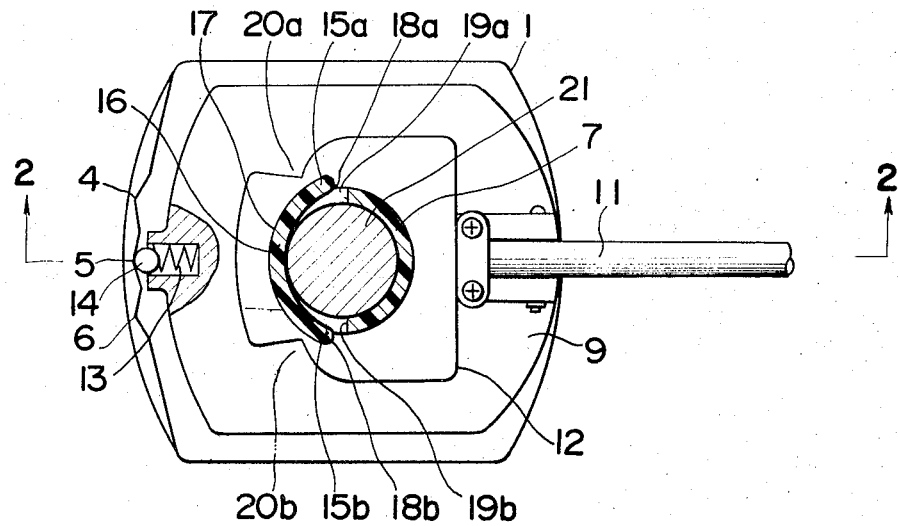
FIG. 1 is a partially cut-off plan view of an embodiment of the invention.
Figure 2:
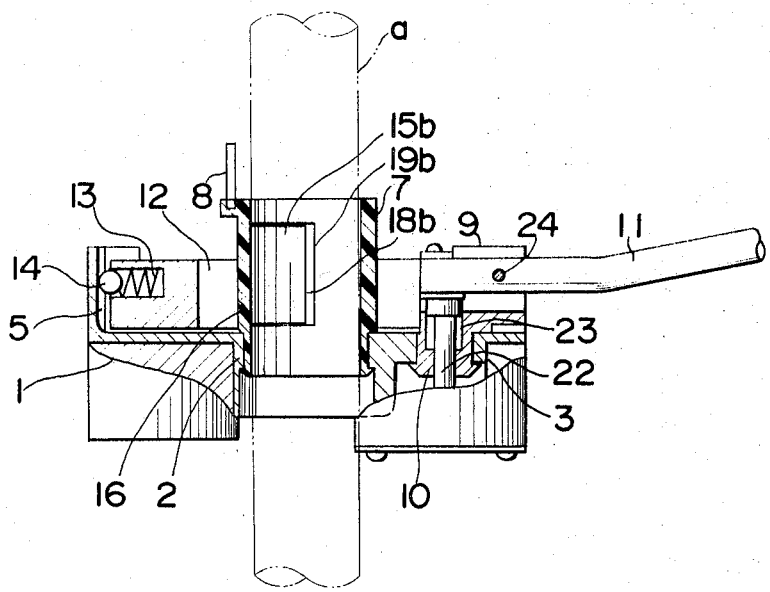
FIG. 2 is a cross-sectional views through 2—2 of FIG. 1.

Referring to FIGS. 1 and 2, a central hole 2 is located in main body 1, through which a steering column 21 passes, and a bearing hole 3 parallel thereto. At the upper surface of the front of the body 1, there is formed an undulate portion comprising three adjacent declivities 4, 5 and 6. The body 1 supports a movable bracket 9 which has cam lobes or projections 20a and 20b, is rotatably supported in the hole 3 by hollow shaft 10, and is suitably connected to the control lever 11 so as to turn the movable bracket 9. An undulate angle control assembly is formed by ball 14 elastically held in one of the declivities 4, 5 and 6. The rotary body 7 is a synthetic resin, movable cylinder, which is supported and free to turn with the steering column 21, and which comprises a central portion 16 and arcuate, flexible extensions 15a and 15b, which lead from the central portion, and have a curved circumferential portion passing round either side of the steering column 21 with an outer periphery 17. The ends of the extensions 15a and 15b form a pair of cantilever-like ratchet arms with contact portions 18a and 18b which point in the direction of return movement of the steering column 21. At the free ends, or terminal contact portions 18a, 18b the arms 15a and 15b are separated from the inner surface of the body curved portion, by gaps 19a, 19b. Engagement projections 20a, 20b are formed on the sides of the movable bracket 9 facing the steering column 21; as shown in FIG. 1, these projections 20a and 20b lie just outside the circle of rotation of the extension arms 15a and 15b.

Figure 4:
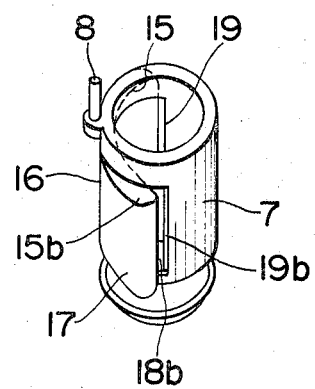
FIG. 4 is an oblique view of the movable rotary cylinder.

The rotary body 7 is shown in FIG. 1 as an oblique plan view. As seen from FIG. 4, the gaps 19a and 19b separate the extension arms 15a and 15b respectively, from the body 7, and 15a and 15b extend from the center portion 16 with an outer periphery 17, which curves out in the direction in which the steering column 21 is turned.

The projection 8 in FIG. 2 extends upwardly for engaging, during rotation, a hole in a steering wheel (not shown) to which the steering column 21 is connected at its upper end.

A push rod 22 is provided for a head lamp switch (not shown) inserted into hollow shaft 10, and a spring 23 pushes the push rod 22 upward against the lever 11, a shaft 24 is provided around which the lever 11 is slightly turned to upward or downward, thereby the push rod 22 is operated to close or open the switch.

Figure 3:
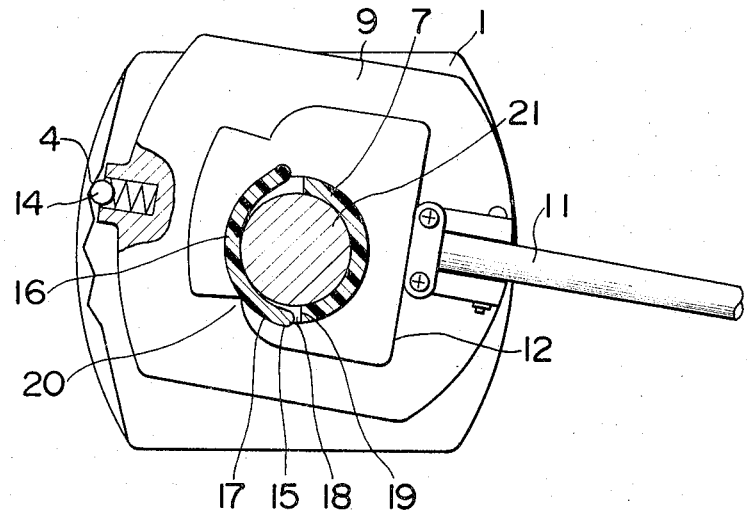
FIG. 3 is a plan view showing the operation of the embodiment of FIG. 1.

In this direction indicator, as illustrated in FIG. 3, when the movable bracket 9 is turned, to obtain indication of a turn in one direction, engagement projection 20a or 20b is brought within the circle of rotation of one of the extending arms 15a or 15b, in this case projection 20 is brought in the circle of rotation of the arm 15. When now the steering column 21 is turned in the indicated direction, the projection 20 presses against and slides along the outer periphery 17, which bends flexible extension 15 into the space 19. The flexible arm 15 offers no hindrance to turning the steering column 21, and the terminal contact portion 18 passes over the projection 20b. When, after completion of the vehicle turn, the steering column 21 is turned back, the terminal contact portion 18 of arm 15 comes into contact with the face of engagement portion 20 and forces bracket 9 back to the central position, which cuts the direction change signal.

In this case, the engagement projection 20a of the movable bracket 9 is not brought within the circle of rotation of the flexible arm 15a. The operation of the engagement projection 20a upon the turning of the movable bracket 9 to obtain indication of a turn in other direction, is similar to that of the engagement projection 20b of the flexible arm 20b as described above.

As explained above, in the present invention, extremely simple engagement projections 20a and 20b are formed in a movable bracket and the steering column has mounted an assembly which turns with it, inside the projections 20a and 20b, and are provided with flexible extensions 15a and 15b. Thus, only small parts are required and the device can be built as one unit and the invention offers the advantage of simplification of assembly and production of direction indicator units.

What is claimed is:

1. An automatic return direction indicating device of the type having a movable bracket arranged around a steering column, said movable bracket being moved by a control lever to one of a position indicating a left turn, a right turn or a neutral position of the steering column, said device comprising an element secured to the steering column for rotation therewith, said element being formed with at least two flexible extensions extending outwardly from the surface of said steering column; and at least two rigid engagement projections provided on the movable bracket to be within the range of movement of said flexible extensions when the steering column is turned, wherein one of said flexible extensions engages one of said projections when said steering column is turned and pushes said projection, thereby moving the movable bracket to the neutral indicating position when the steering column is returned to the neutral position.

2. An automatic return device according to claim 1, wherein said element is formed of a concentric cylinder secured to said steering column, and said flexible extensions are formed from peripheral surfaces of said cylinder.

3. An automatic return device according to claim 2, wherein clearance spaces are formed between ends of said flexible extensions and the peripheral surface of said cylinder, so that one of said projections bends the corresponding flexible extension into one of said spaces when said steering column is turned until said projection passes the end of said flexible extension.

* * * * *